United States Patent
Rico Alvarino et al.

(10) Patent No.: US 11,006,405 B2
(45) Date of Patent: *May 11, 2021

(54) MULTI-PRB OPERATION FOR NARROWBAND SYSTEMS

(71) Applicant: QUALCOMM Incorporated, San Diego, CA (US)

(72) Inventors: Alberto Rico Alvarino, San Diego, CA (US); Xiao Feng Wang, San Diego, CA (US); Hao Xu, Beijing (CN); Wanshi Chen, San Diego, CA (US); Peter Gaal, San Diego, CA (US); Juan Montojo, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,277

(22) Filed: Sep. 20, 2019

(65) Prior Publication Data

US 2020/0010268 A1 Jan. 9, 2020

Related U.S. Application Data

(63) Continuation of application No. 15/428,242, filed on Feb. 9, 2017, now Pat. No. 10,477,537.

(Continued)

(51) Int. Cl.
*H04W 72/04* (2009.01)
*H04W 4/00* (2018.01)
(Continued)

(52) U.S. Cl.
CPC .......... *H04W 72/044* (2013.01); *B65D 19/06* (2013.01); *B65D 19/385* (2013.01);
(Continued)

(58) Field of Classification Search
CPC ....... H04W 72/044; H04W 4/70; H04W 4/00; H04W 48/00; H04W 48/12; H04W 48/16;
(Continued)

(56) References Cited

U.S. PATENT DOCUMENTS 9,622,230 B2  4/2017 Chen et al.
9,750,026 B1  8/2017 Saxena et al.
(Continued)

FOREIGN PATENT DOCUMENTS

CN    104348600 A    2/2015
WO    2013173673 A2  11/2013
(Continued)

OTHER PUBLICATIONS

International Search Report and Written Opinion—PCT/US2017/017320—ISA/EPO—dated May 11, 2017.
(Continued)

*Primary Examiner* — Michael J Moore, Jr.
(74) *Attorney, Agent, or Firm* — Patterson & Sheridan, L.L.P.

(57) ABSTRACT

Aspects of the present disclosure provide techniques and apparatus for multiple physical resource block (PRB) operations for narrowband (NB) systems, such as NB internet-of-things (IoT). In one aspect, a method is provided which may be performed by a wireless device such as a user equipment (UE), which may be an NB-IoT device. The method generally includes performing a cell search based on one or more signals received in an anchor RB within a set of RBs available for narrowband communications with a base station (BS); determining a location of at least one additional RB available for the narrowband communications with the BS based on an indication received in the anchor
(Continued)

RB; and performing narrowband communications with the BS using at least one of: the anchor RB or the at least one additional resource block.

48 Claims, 11 Drawing Sheets

Related U.S. Application Data

(60) Provisional application No. 62/294,150, filed on Feb. 11, 2016.

(51) Int. Cl.

| | | |
|---|---|---|
| H04W 4/70 | (2018.01) | |
| H04W 48/12 | (2009.01) | |
| H04W 48/00 | (2009.01) | |
| B65D 19/06 | (2006.01) | |
| B65D 19/38 | (2006.01) | |
| B65D 21/02 | (2006.01) | |
| B65D 85/00 | (2006.01) | |
| B65D 88/30 | (2006.01) | |
| B65D 88/32 | (2006.01) | |
| B65D 90/12 | (2006.01) | |
| B65G 63/00 | (2006.01) | |
| B65G 65/30 | (2006.01) | |
| F16M 11/04 | (2006.01) | |
| H04L 5/00 | (2006.01) | |
| H04W 48/16 | (2009.01) | |
| H04W 68/00 | (2009.01) | |
| H04W 74/08 | (2009.01) | |
| H04W 4/02 | (2018.01) | |

(52) U.S. Cl.
CPC ......... *B65D 21/0201* (2013.01); *B65D 85/70* (2013.01); *B65D 88/30* (2013.01); *B65D 88/32* (2013.01); *B65D 90/125* (2013.01); *B65G 63/004* (2013.01); *B65G 65/30* (2013.01); *F16M 11/04* (2013.01); *H04L 5/0048* (2013.01); *H04W 4/00* (2013.01); *H04W 4/70* (2018.02); *H04W 48/00* (2013.01); *H04W 48/12* (2013.01); *H04W 48/16* (2013.01); *H04W 68/005* (2013.01); *H04W 74/0833* (2013.01); *B65D 2519/00273* (2013.01); *B65D 2519/00323* (2013.01); *B65D 2519/00532* (2013.01); *B65D 2590/0091* (2013.01); *H04W 4/02* (2013.01); *H04W 4/023* (2013.01)

(58) Field of Classification Search
CPC . H04W 68/005; H04W 74/0833; H04W 4/02; H04W 4/023; B65D 19/06; B65D 19/385; B65D 21/0201; B65D 85/70; B65D 88/30; B65D 88/32; B65D 90/125; B65D 2519/00273; B65D 2519/00323; B65D 2519/00532; B65D 2590/0091; B65G 63/004; B65G 65/30; F16M 11/04; H04L 5/0048

See application file for complete search history.

(56) References Cited

U.S. PATENT DOCUMENTS

| | | | |
|---|---|---|---|
| 10,477,537 B2* | 11/2019 | Rico Alvarino | H04W 48/00 |
| 2009/0316659 A1 | 12/2009 | Lindoff et al. | |
| 2015/0049741 A1 | 2/2015 | Chen et al. | |
| 2016/0309282 A1 | 10/2016 | Xu et al. | |
| 2017/0094621 A1 | 3/2017 | Xu et al. | |
| 2017/0238284 A1 | 8/2017 | Tseng et al. | |
| 2017/0238292 A1 | 8/2017 | Rico Alvarino et al. | |
| 2018/0070317 A1 | 3/2018 | Chen et al. | |
| 2018/0124644 A1 | 5/2018 | Rico Alvarino et al. | |
| 2018/0176919 A1 | 6/2018 | Takahashi et al. | |
| 2018/0212698 A1 | 7/2018 | Sun et al. | |
| 2018/0241495 A1 | 8/2018 | Xue et al. | |
| 2019/0069150 A1 | 2/2019 | Blankenship et al. | |

FOREIGN PATENT DOCUMENTS

| | | |
|---|---|---|
| WO | 2016018469 A1 | 2/2016 |
| WO | 2017053021 A1 | 3/2017 |
| WO | WO-2017053024 A1 | 3/2017 |
| WO | 2017135287 A1 | 8/2017 |

OTHER PUBLICATIONS

Lenovo: "Discussion on NB-IoT Multi-Carrier Operation", 3GPP Draft, R1-161008, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 6, 2016 (Feb. 6, 2016), XP051064490, Retrieved from the Internet: URL: http://www.3gpp.org/ftp/tsg_ran/WG1_RL1/TSGR1_84/Docs/ [retrieved on Feb. 6, 2016].

Nokia Networks., et al., "NB-IoT Operation in Multiple PRBs", 3GPP Draft, R1-160447, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 5, 2016 (Feb. 5, 2016), XP051063773, Retrieved from the Internet: URL: http://www.3gpp.org/ftp/tsg_ran/WG1_RL1/TSGR1_84/Docs/ [retrieved on Feb. 5, 2016].

Samsung: "Considerations on Multi-PRB Support", 3GPP Draft, R1-160552, Multi-PRB Support, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 5, 2016 (Feb. 5, 2016), XP051063843, Retrieved from the Internet: URL: http://www.3gpp.org/ftp/tsg_ran/WG1RL1/TSGR1_84/Docs/ [retrieved on Feb. 5, 2016].

Sony: "Considerations on Multi NB-IoT Carriers", 3GPP Draft, R1-160671 - REL-13 NB-IOT-Multi-Carrier, 3rd Generation Partnership Project (3GPP), Mobile Competence Centre, 650, Route Des Lucioles, F-06921, Sophia-Antipolis Cedex, France, vol. RAN WG1, No. St Julian's, Malta, Feb. 15, 2016-Feb. 19, 2016, Feb. 6, 2016, XP051064299, Retrieved from the Internet: URL: http://www.3gpp.org/ftp/tsg_ran/WG1_RL1/TSGR1_84/Docs/ [retrieved on Feb. 6, 2016].

European Search Report—EP20151195—Search Authority—Munich—dated Apr. 9, 2020.

Ericsson: "NB-IoT—Indication of Deployment Mode", 3GPP TSG-RAN WG1 Meeting #84, R1-160268, Feb. 15-19, 2016, St. Julian, Malta, Internet URL: http://www.3gpp.org/ftp/tsg_ran/WG1_RL1/TSGR1_84/Docs/R1-160268.zip , pp.1-4.

Huawei et al., "NB-IOT—Downlink Physical Layer Concept Description", 3GPP Draft, 3GPP TSG RAN WG1 Meeting 183, R1-156462, 3rd Generation Partnership Project (3GPP), Mobile Competence Centre, 650, Route Des Lucioles, F-06921, Sophia-Antipolis Cedex, France, vol. RAN WG1, No. Anaheim, USA, Nov. 15, 2015-Nov. 22, 2015, Nov. 15, 2015 (Nov. 15, 2015), XP051039851, 11 pages, Chapters 2, 3.3, 4.1, 10.2 and 11.1, Retrieved from the Internet: URL: http://www.3gpp.org/ftp/Meetings_3GPP_SYNC/RAN1/Docs1.

Samsung: "The Control Plane Ciot Optimization", 3GPP TSG-RAN WG3 #91, R3-160168, St. Julian's, Malta, Feb. 15-19, 2016, Internet http://www.3gpp.org/ftp/tsg_ran/WG3_lu/TSGR3_91/Docs/R3-160168.zip,4 Pages.

Taiwan Search Report—TW106104365—TIPO—dated Nov. 11, 2020.

(56) References Cited

OTHER PUBLICATIONS

ZTE: "Considerations on multiple carriers operation for NB-IoT", 3GPP TSG RAN WG1 Meeting #84, R1-160472, St Julian's, Malta, Feb. 15-19, 2016, Internet URL: http://www.3gpp.org/ftp/tsg_ran/WG1_RL1/TSGR1_84/Docs/ R1-1604722ip, 3 Pages.

* cited by examiner

MULTI-PRB OPERATION FOR NARROWBAND SYSTEMS

CROSS-REFERENCE TO RELATED APPLICATION & PRIORITY CLAIM

This application is a continuation of U.S. application Ser. No. 15/428,242, filed Feb. 9, 2017, issued as U.S. Pat. No. 10,477,537 with an issue date of Nov. 12, 2019, which claims priority to Provisional Patent Application Ser. No. 62/294,150, filed Feb. 11, 2016, both of which are herein incorporated by reference in their entirety for all applicable purposes.

BACKGROUND

Field of the Disclosure

Certain aspects of the present disclosure generally relate to wireless communications and, more particularly, to multiple physical resource block (PRB) operations for narrowband systems.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to multiple physical resource block (PRB) operations for narrowband systems.

Certain aspects of the present disclosure provide a method, performed by a user equipment (UE). The method generally includes performing a cell search based on one or more signals received in an anchor resource block (RB) within a set of RBs available for narrowband communications with a base station (BS); determining a location of at least one additional RB available for the narrowband communications with the BS based on an indication received in the anchor RB; and performing narrowband communications with the BS using at least one of: the anchor RB or the at least one additional RB.

Certain aspects of the present disclosure provide a method, performed by a BS. The method generally includes sending one or more signals in an anchor RB within a set of RBs available for narrowband communications with a UE; signaling, in the anchor RB, an indication of a location of at least one additional RB available for the narrowband communications with the UE; and performing narrowband communications with the UE using at least one of: the anchor RB or the at least one additional RB.

Certain aspects of the present disclosure provide an apparatus, such as a UE. The apparatus generally includes means for performing a cell search based on one or more signals received in an anchor RB within a set of RBs available for narrowband communications with a BS; means for determining a location of at least one additional RB available for the narrowband communications with the BS based on an indication received in the anchor RB; and means for performing narrowband communications with the BS using at least one of: the anchor RB or the at least one additional RB.

Certain aspects of the present disclosure provide an apparatus, such as a BS. The apparatus generally includes means for sending one or more signals in an anchor RB within a set of RBs available for narrowband communications with a UE; means for signaling, in the anchor RB, an indication of a location of at least one additional RB available for the narrowband communications with the UE; and means for performing narrowband communications with the UE using at least one of: the anchor RB or the at least one additional RB.

Certain aspects of the present disclosure provide an apparatus, such as a UE. The apparatus generally includes at least one processor configured to perform a cell search based on one or more signals received in an anchor RB within a set of RBs available for narrowband communications with a BS; determine a location of at least one additional RB available for the narrowband communications with the BS based on an indication received in the anchor RB; and perform narrowband communications with the BS using at least one of: the anchor RB or the at least one additional RB; and a memory coupled with the at least one processor.

Certain aspects of the present disclosure provide an apparatus, such as a BS. The apparatus generally includes at least one processor configured to send one or more signals in an anchor RB within a set of RBs available for narrowband communications with a UE; signal, in the anchor RB, an indication of a location of at least one additional RB available for the narrowband communications with the UE; and perform narrowband communications with the UE using at least one of: the anchor RB or the at least one additional RB.

Certain aspects of the present disclosure provide a computer readable medium having computer executable code stored thereon for wireless communications by a UE. The computer executable code generally includes code for performing a cell search based on one or more signals received in an anchor RB within a set of RBs available for narrowband communications with a BS; code for determining a location of at least one additional RB available for the narrowband communications with the BS based on an indication received in the anchor RB; and code for performing narrowband communications with the BS using at least one of: the anchor RB or the at least one additional RB.

Certain aspects of the present disclosure provide a computer readable medium having computer executable code stored thereon. The computer executable code generally includes code for sending one or more signals in an anchor RB within a set of RBs available for narrowband communications with a UE; code for signaling, in the anchor RB, an indication of a location of at least one additional RB available for the narrowband communications with the UE; and code for performing narrowband communications with the UE using at least one of: the anchor RB or the at least one additional RB.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
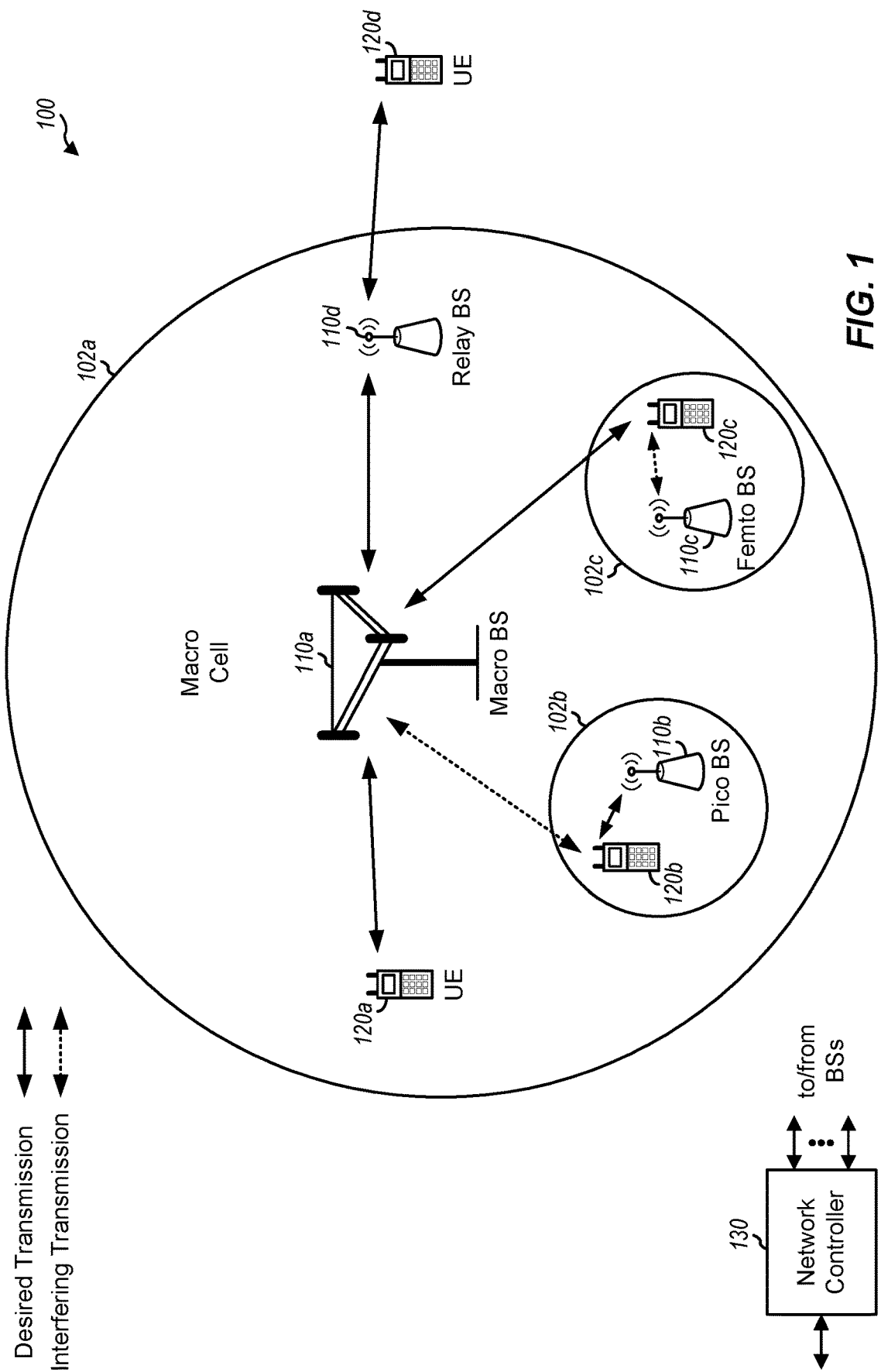
FIG. 1 is a block diagram conceptually illustrating an example of a wireless communication network, in accordance with certain aspects of the present disclosure.

Aspects of the present disclosure provide techniques for multiple physical resource block (PRB) operations for narrowband (NB) communications, such as NB internet-of-things (IoT). According to certain aspects, a user equipment (UE), such as an IoT device may perform a cell search based on one or more signals transmitted in an anchor resource block (RB) within a set of RBs available for narrowband communications with a base station (BS). The BS may signal a location (e.g., a frequency location) of additional RBs available for the narrowband communications. The BS may communicate with the UE on the anchor RB and/or on the additional RBs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as new radio (NR) (e.g., 5G radio access), evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development in conjunction with the 5G Technology Forum (5GTF). The techniques described herein may be used for the wireless networks and radio technologies mentioned above as well as other wireless networks and radio technologies. For clarity, while certain aspects of the techniques are described below for LTE/LTE-Advanced, and LTE/LTE-Advanced using terminology commonly associated with 3G and/or 4G wireless technologies, aspects of the present disclosure can be applied in other generation-based communication systems, such as 5G and later, including NR technologies.

An Example Wireless Communications Network

FIG. 1 illustrates an example wireless communication network 100, in which aspects of the present disclosure may be practiced. For example, wireless communication network 100 may support multiple physical resource block (PRB) operation for narrowband (NB) internet-of-things (IoT). Wireless communication network 100 may be a new radio (NR) or 5G network. In aspects, wireless communication network 100 may include user equipment (UE) 120, which may be an IoT device, and base stations (BS) 110. UEs 120 may be and BSs 110 may be configured to perform the operations 1100 and 1200, respectively, discussed in more detail below for multiple PRB operation. For example, UE 120 can perform a cell search based on one or more signals transmitted by a BS 110 in an anchor RB within a set of RBs available for narrowband communications with the BS 110) in the cell (e.g., cell 102). UE 120 can determine a location (e.g., a frequency location) of at least one additional RB available for the narrowband communications with the BS 110, for example, based on an indication received from BS 110. UE 120 can perform narrowband communications with BS 110 using the anchor RB and/or the additional RBs.

Wireless communication network 100 may be a long term evolution (LTE) network or some other wireless network, such as an NR or 5G network. Wireless communication network 100 may include a number of BSs 110 and other network entities. A BS is an entity that communicates with UEs and may also be referred to as a Node B, an enhanced/evolved Node B (eNB), a 5G NB, a gNB, an access point (AP), a transmission reception point (TRP), a NR BS, a Master BS, a primary BS, etc. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "BS", "base station" and "cell" may be used interchangeably herein.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

UEs 120 (e.g., 120a, 120b, 120c) may be dispersed throughout wireless communication network 100, and each UE may be stationary or mobile. A UE may also be referred to as an access terminal, a terminal, a mobile station, a subscriber unit, a station, a Customer Premises Equipment (CPE), a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, medical equipment, a biometric sensor/device, a wearable device such as a smart watch, smart clothing, smart glasses, a smart wristband, and/or smart jewelry (e.g., a smart ring, a smart bracelet, etc.), an entertainment device (e.g., a music device, a video device, a satellite radio, etc.), industrial manufacturing equipment, a global positioning system (GPS) device, or any other suitable device configured to communicate via a wireless or wired medium. Some UEs may be considered machine-type communication (MTC) devices or enhanced/evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. For scheduled communication, subordinate entities utilize resources allocated by the scheduling entity. BSs 110 are not the only entities that may function as a scheduling entity. In some examples, UE 120 may function as a scheduling entity, scheduling resources for one or more subordinate entities (e.g., one or more other UEs 120). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
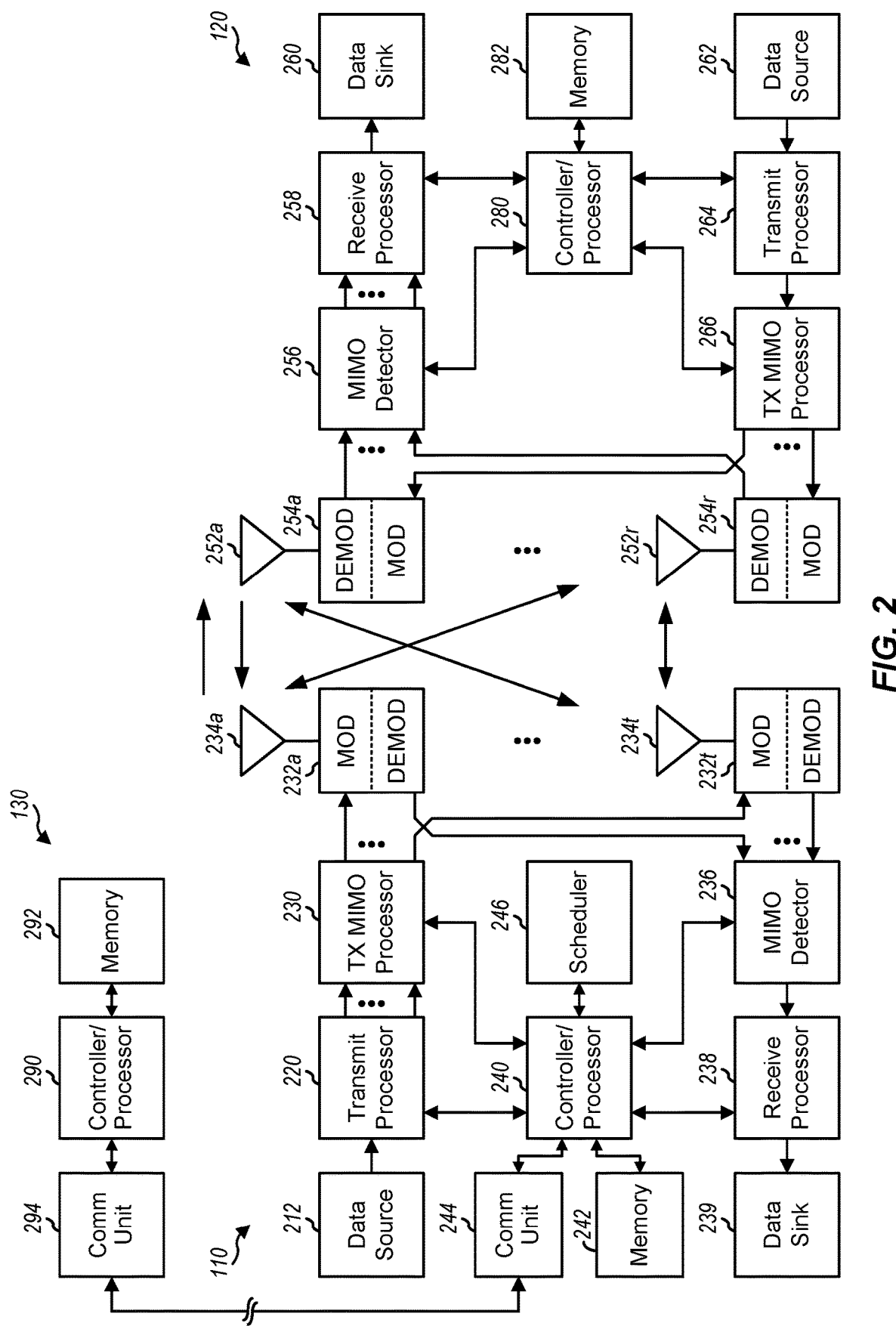
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the BSs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE 120 based on CQIs received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., channel quality information (CQI) requests, grants, upper layer signaling, etc.) and provide overhead symbols and control symbols. Processor 220 may also generate reference symbols for reference signals (e.g., the cell-specific/common reference signal (CRS)) and synchronization signals (e.g., the primary synchronization signal (PSS) and the secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine received signal receive power (RSRP), received signal strength indicator (RSSI), received signal receive quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to BS 110.

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein for multiple PRB operation for IoT to use for communications between a UE (e.g., an IoT device) and a BS. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120, and/or controller/processor 240 and/or other controllers/processors and modules at BS 110 may perform or direct operations 1100 and 1200 shown in FIGS. 11 and 12, respectively. Memories 242 and 282 may store data and program codes for base station 110 and UE 120, respectively. A scheduler 246 may schedule UEs for data transmission on the downlink and/or uplink.

Figure 3:
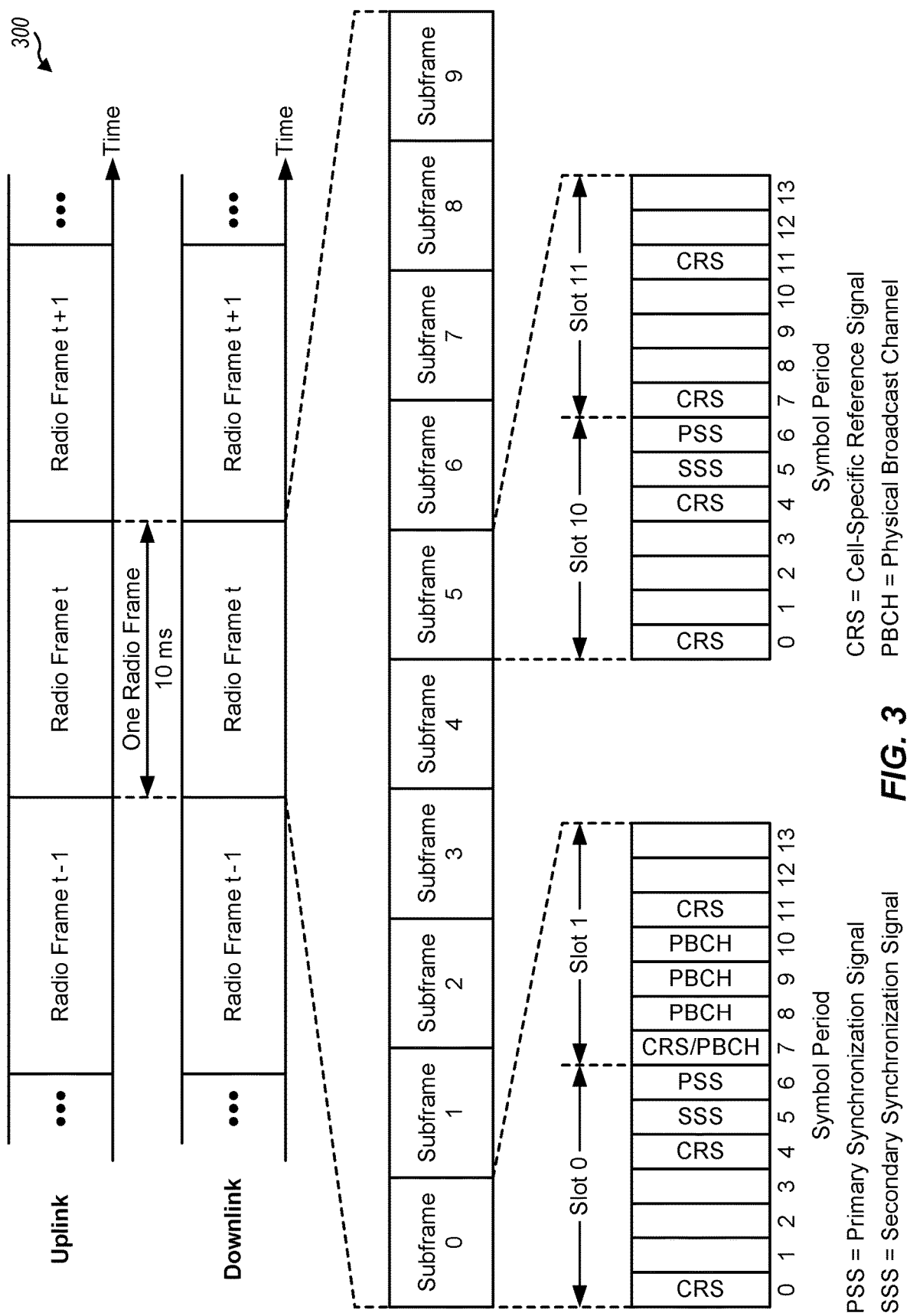
FIG. 3 is a block diagram conceptually illustrating an example of a frame structure in a wireless communications network, in accordance with certain aspects of the present disclosure.

FIG. 3 shows an exemplary frame structure 300 for frequency division duplexing (FDD) in a wireless communication system, for example, such as wireless communication system 100. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain systems (e.g., LTE), a BS may transmit a PSS and a SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a CRS across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

Figure 4:
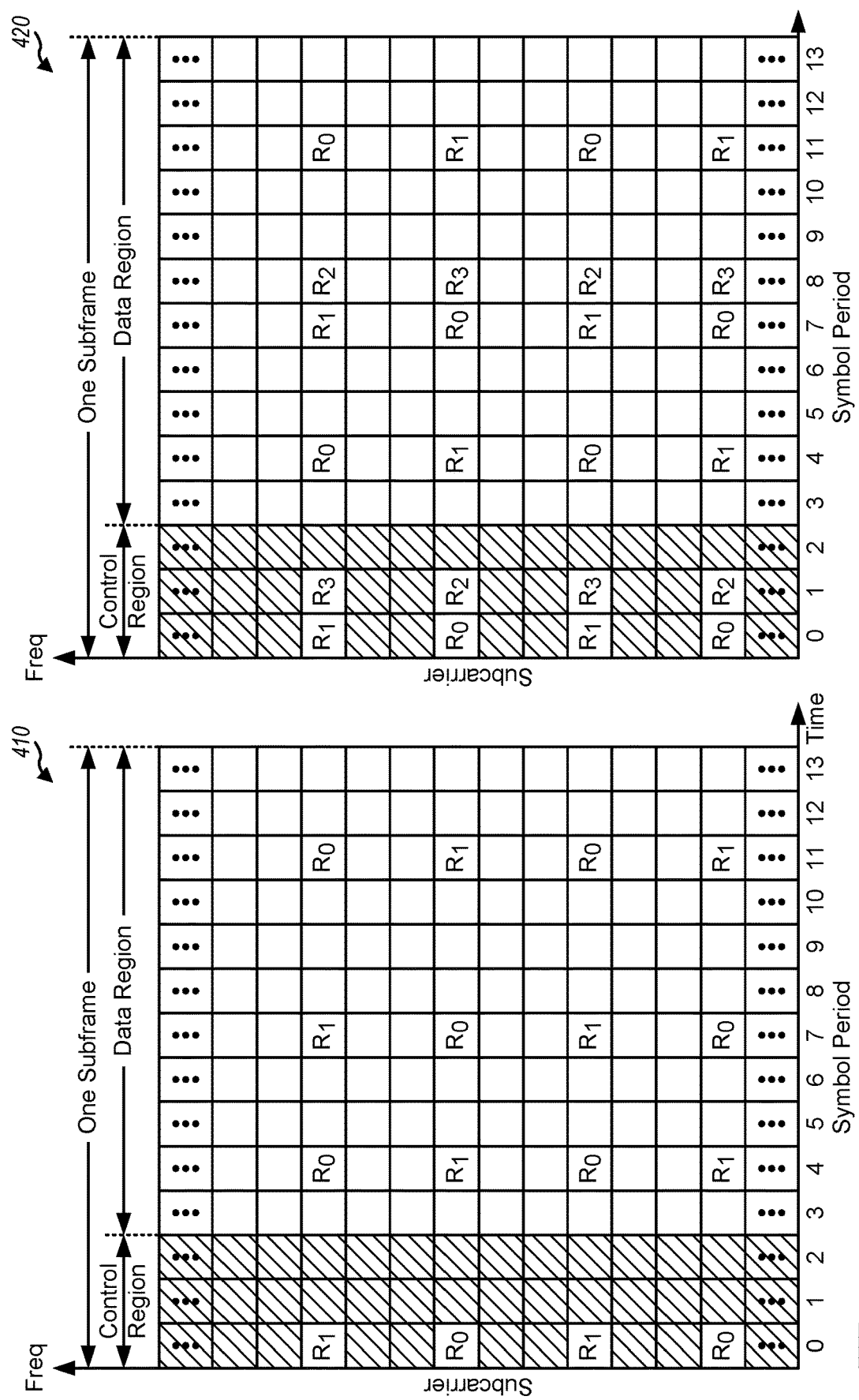
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label Ra, a modulation symbol may be transmitted on that RE from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for certain FDD systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A wireless network, for example, such as wireless communication network 100, may support hybrid automatic retransmission request (HARQ) operation for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example Narrowband Operations

One or more UEs 120 in the wireless communication network 100 (e.g., an LTE, NR, or 5G network) may also be a narrowband bandwidth UE. As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

These UEs may co-exist with legacy and/or advanced UEs (e.g., capable of operating on a wider bandwidth) in wireless communication network 100 and may have one or more capabilities that are limited as compared to other UEs in wireless communication network 100. For narrowband UEs, various requirements may be relaxed as only a limited amount of information may need to be exchanged. For example, UEs supporting narrowband communications that operate according to LTE Rel-12 (and later releases), may have limited communication resources as compared to legacy and/or advanced UEs that operate according to an earlier LTE Release. Narrowband UEs, may operate with one or more of the following: a reduction in maximum bandwidth (relative to legacy wideband UEs), use of a single receive radio frequency (RF) chain, reduction of peak rate (e.g., a maximum of 1000 bits for a transport block size (TBS) may be supported), reduction of transmit power, use of Rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (μs) for legacy and/or advanced UEs, the narrowband UEs may have a relaxed switching timing of 1 millisecond (ms).

In some cases, the narrowband UEs may also be able to monitor downlink (DL) control channels in the same away as legacy and/or advanced UEs monitor wideband DL control channels in the first few symbols (e.g., physical downlink control channel (PDCCH)) as well as monitor narrowband DL control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

In some cases, a UE (e.g., a narrowband UE or a wideband UE) may perform a cell search and acquisition procedure before communicating in the network. In one case, with reference to wireless communication network 100 illustrated in FIG. 1 as an example, the cell search and acquisition procedure may be performed when the UE is not connected to a cell and wants to access the wireless communication network 100. In these cases, the UE may have just powered on, restored a connection after temporarily losing connection to the cell, etc. In other cases, the cell search and acquisition procedure may be performed when the UE is already connected to a cell. For example, the UE may have detected a new cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
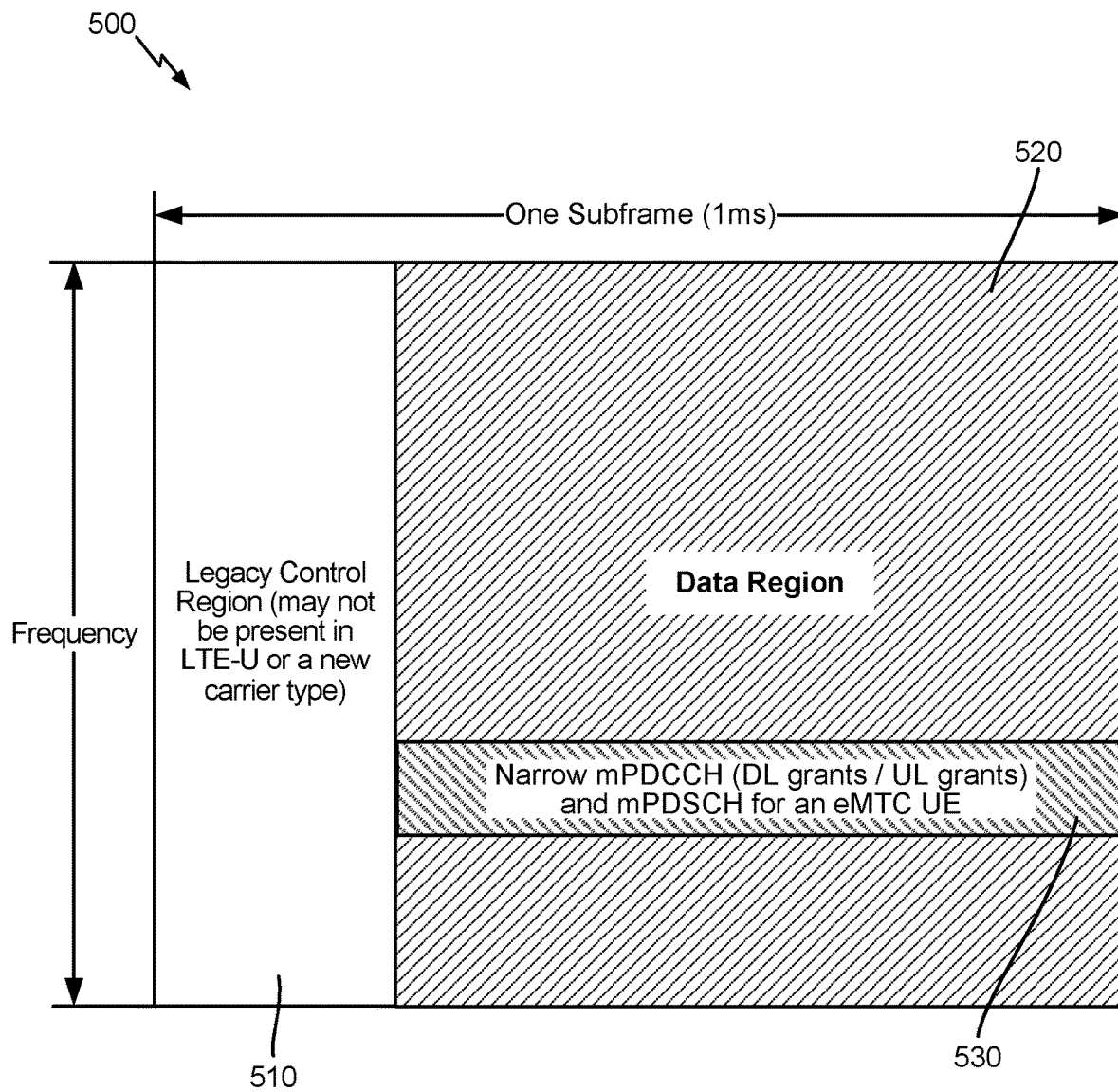
FIG. 5 illustrates an exemplary subframe configuration for narrowband communications, in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 RBs.

eMTC UEs may be able to operate in a cell with a bandwidth larger than 6 RBs. Within this larger bandwidth, each eMTC UE may still operate (e.g., monitor/receive/transmit) while abiding by a six physical resource block (PRB) constraint. In some cases, different eMTC UEs may be served by different narrowband regions (e.g., with each spanning six PRBs). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

The Internet-of-Things (IoT) may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to as cyber-physical systems. Cyber-physical systems may include technologies such as smart grids, smart homes, intelligent transportation, and/or smart cities. Each "thing" (e.g., IoT device) may be uniquely identifiable through its embedded computing system may be able to interoperate within existing infrastructure, such as Internet infrastructure.

Narrowband IoT (NB-IoT) may refer to a narrowband radio technology specially designed for the IoT. NB-IoT may focus on indoor coverage, low cost, long battery life, and large number of devices.

To reduce the complexity of UEs, NB-IoT may allow for narrowband deployments utilizing one physical resource block (PRB) (e.g., 180 kHz+20 kHz guard band). NB-IoT deployments may utilize higher layer components of certain systems (e.g., LTE) and hardware to allow for reduced fragmentation and cross compatibility with, for example, NB-LTE and/or enhanced/evolved machine type communications (eMTC). For example, a wireless communication network (e.g., such as wireless communication network 100) may support a 180 kHz deployment for narrowband operation (e.g., NB-IoT) with different deployment modes. In one example, narrowband operations may be deployed in-band, for example, using RBs within a wider system bandwidth. In one case, narrowband operations may use one RB within the wider system bandwidth of a legacy network (e.g., such as an LTE, NR, or 5G network). In this case, the 180 kHz bandwidth for the RB may be aligned with a wideband RB. In one example, narrowband operations may be deployed in the unused RBs within the system carrier guard-band. In this deployment, the 180 kHz RB within the guard band may be aligned with a 15 kHz tone grid of the system (e.g., wideband LTE), for example, in order to use the same FFT and/or reduce interference in-band legacy communications.

Figure 6:
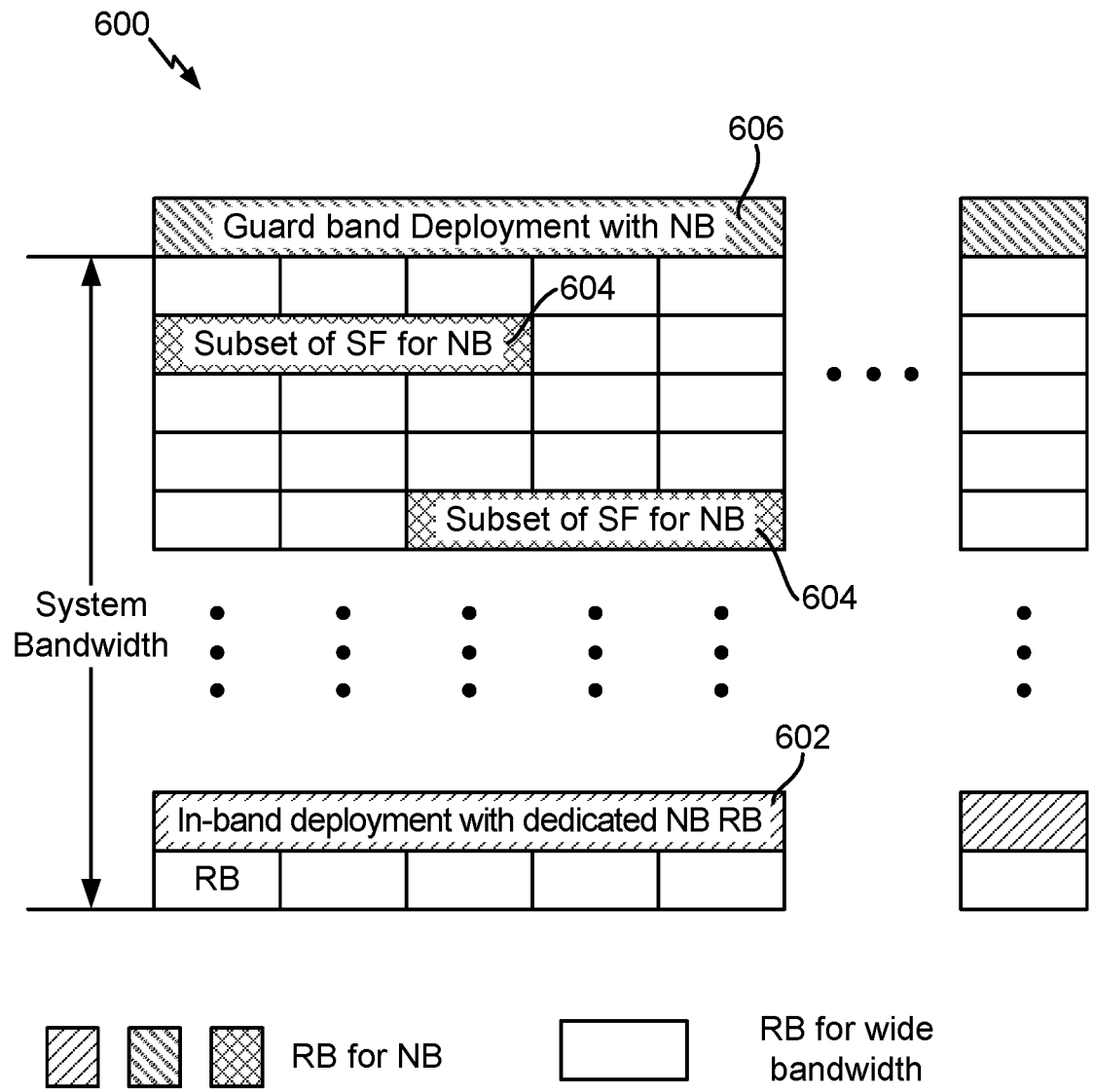
FIG. 6 illustrates an example deployment of narrowband Internet-of-Things (NB-IoT), in accordance with certain aspects of the present disclosure.

FIG. 6 illustrates example NB-IoT deployments 600, according to certain aspects of the present disclosure. For the in-band deployment configuration, NB-IoT may coexist with the legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 6, a dedicated RB 602 within that bandwidth may be available for use by NB-IoT and/or the RBs 604 may be dynamically allocated for NB-IoT. As shown in FIG. 6, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 606 of the wideband channel.

In other deployments, NB-IoT may be deployed stand-alone (not shown). In a standalone deployment, one 200 MHz carrier may be utilized to carry NB-IoT traffic and legacy (e.g., GSM) spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

Example NR/5G RAN Architecture

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g., 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
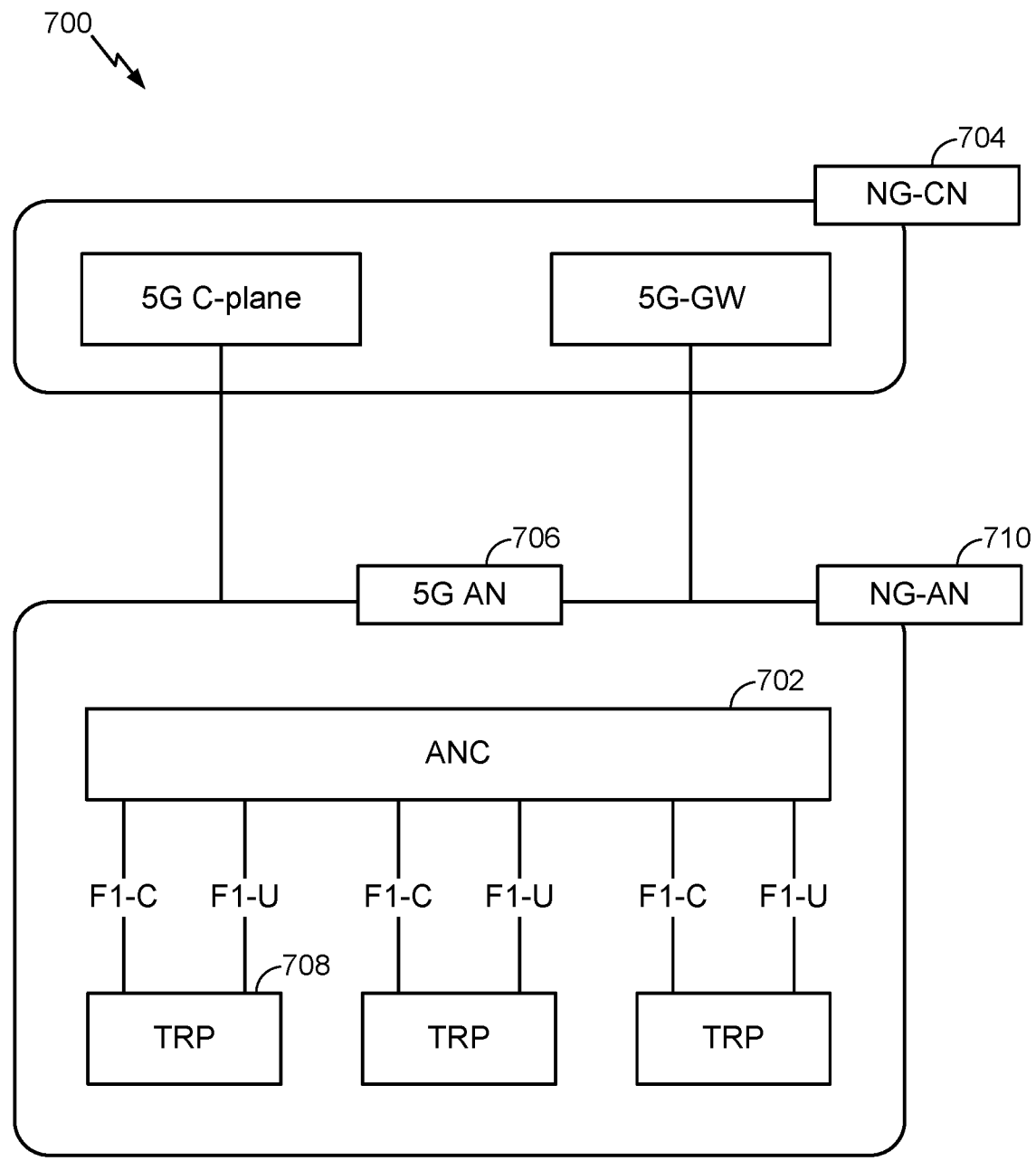
FIG. 7 is a block diagram illustrating an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
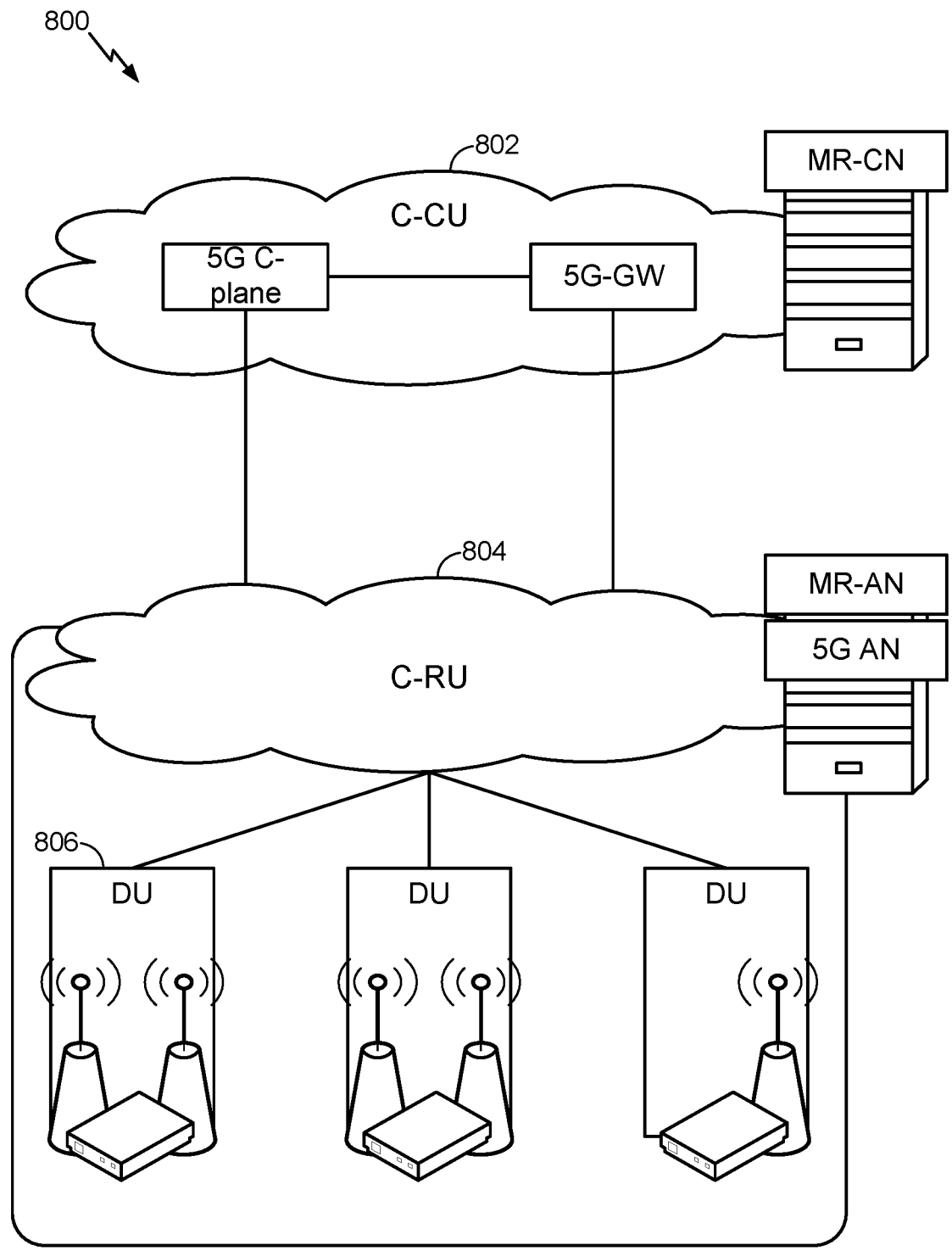
FIG. 8 is a diagram illustrating an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 9:
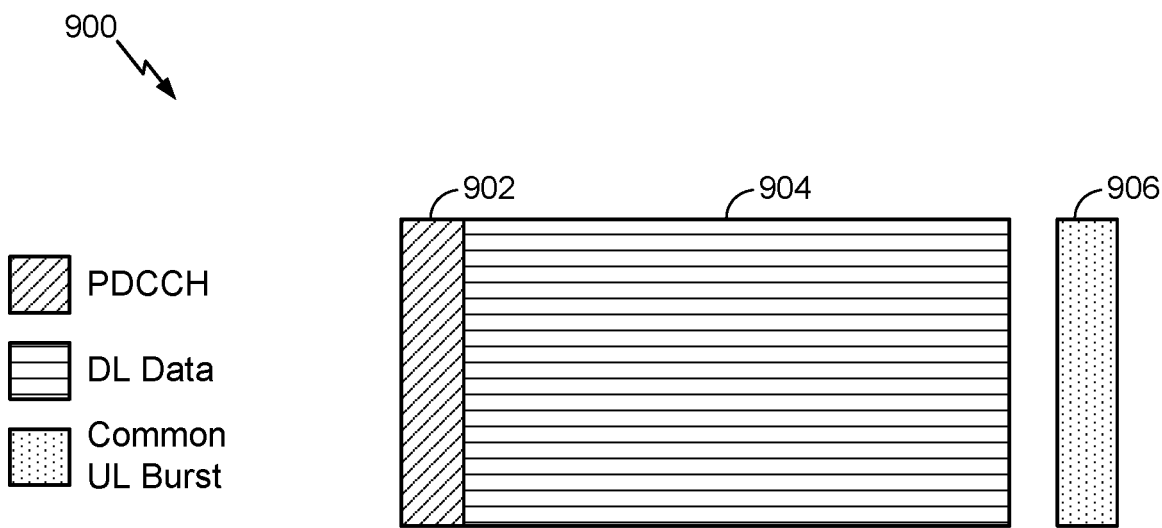
FIG. 9 illustrates an example of a downlink-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PD SCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
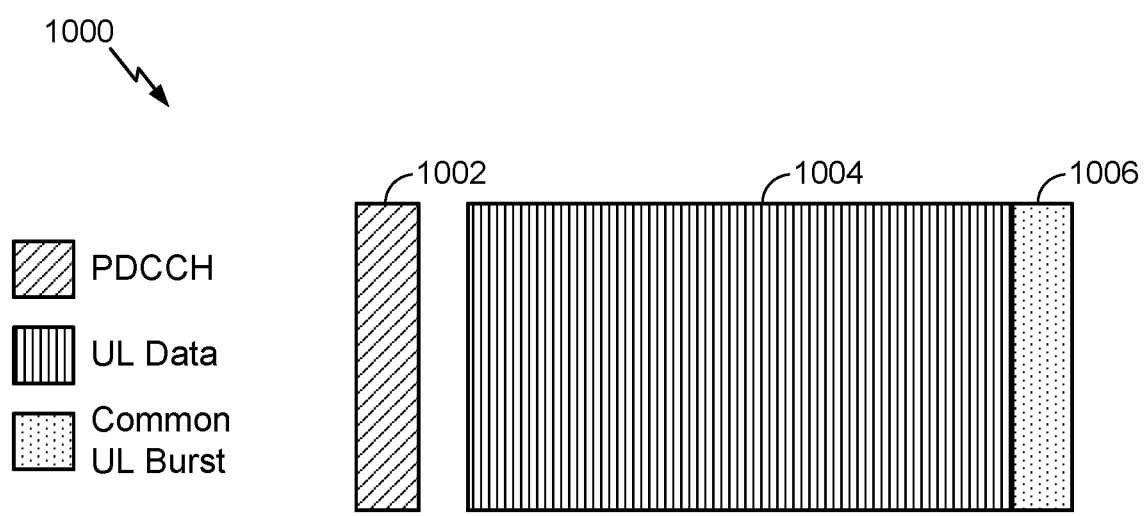
FIG. 10 illustrates an example of an uplink-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or B S). In some configurations, the control portion 1002 may be a PDCCH. In some configurations, the data portion may be a physical uplink shared channel (PUSCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access node (AN), or a distributed unit (DU), or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

Example Multi-PRB Operation for NB-IOT

In certain systems, such as narrowband (NB) Internet-of-Things (IoT) networks (e.g., wireless communication network 100), multiple carrier operations may be supported. NB-IoT can be deployed in in-band, guard band, or standalone modes of operations. The NB-IoT in-band and guard band operation modes of operation may support multiple NB-IoT carrier operations and standalone operation may support multiple carriers.

In aspects, a user equipment (UE) (e.g., UE 120), which may be an NB-IoT device, may search for a cell (e.g., perform a cell search for a BS 110). The UE may find the cell in one particular RB. According to certain aspects, the network can configure (e.g., allocate) the UE with additional frequency resources (e.g., PRBs) that can be used for communication with the cell. For example, the base station can allocate the UE with PRBs via master information block (MIB), system information block (SIB), and/or radio resource control (RRC) signaling.

It may be desirable for the UE to know which resources are configured/available for communications with the BS as well for the UE to know which of the resources are used by the BS or should be used by the UE for various types of communications.

Techniques and apparatus are provided herein for multi-PRB operation that include indicating available resources to the UE and determining which resources to use/monitor for communications in a cell.

Figure 11:
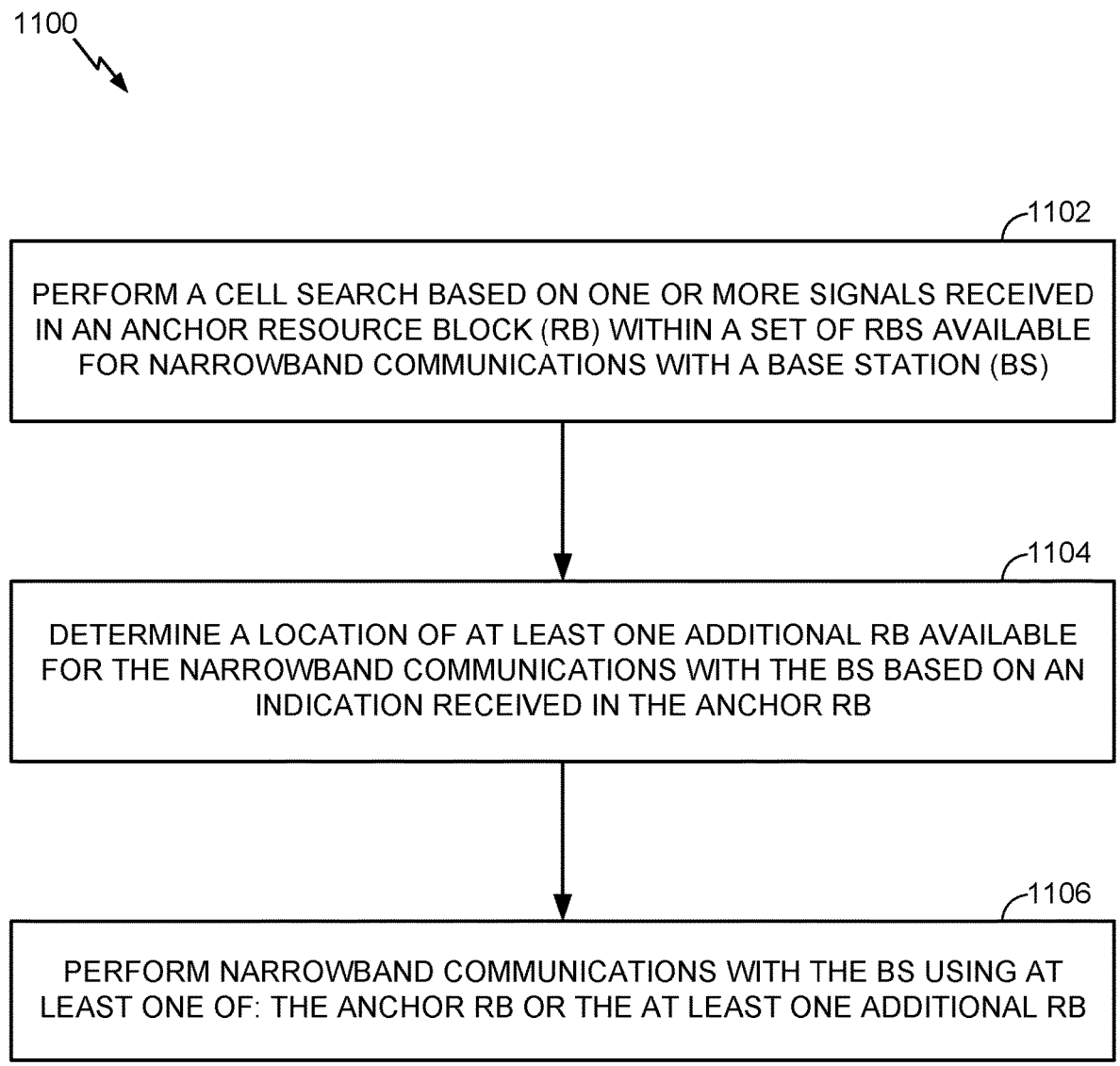
FIG. 11 is a flow diagram illustrating example operations for wireless communications by a UE, in accordance with certain aspects of the present disclosure.

FIG. 11 is a flow diagram illustrating example operations 1100 for multiple PRB operation, in accordance with certain aspects of the present disclosure. The operations 1100 may be performed, for example, by a UE (e.g., UE 120) which may be an NB-IoT device. The operations 1100 may begin, at 1102, by performing a cell search based on one or more signals (e.g., PSS, SSS, and PBCH) received in an anchor RB within a set of RBs available for narrowband communications with a BS (e.g., a BS in a cell detected during the cell search). At 1104, the UE determines a location (e.g., a frequency location) of at least one additional RB (e.g., in-band or guard band,) available for the narrowband communications with the BS based on an indication received in the anchor RB (e.g., broadcast in a master information block (MIB) or system information block (SIB), or transmitted via dedicated signaling such as radio resource control (RRC) signaling). At 1106, the UE performs narrowband communications with the BS using at least one of: the anchor RB or the at least one additional RB. The narrowband communications can be performed differently for different RBs.

Example Signaling of Frequency Resources
Available for Narrowband Communications According to certain aspects, the BS may inform the UE of frequency resources available for narrowband communications. For example, the BS may send an indication of at least one additional RB in a broadcast MIB and/or SIB, and/or in a unicast (e.g., via RRC signaling) transmission.

In one example implementation, the BS may signal absolute indices to the UE to indicate available frequency resources. For example, a 20 MHz system may include 100 PRBs with indices 1-100. To indicate in-band resources, the BS may transmit signaling to the UE indicate the indices of the PRBs available for narrowband communication. The PRB index can also be extended to include guard band PRBs. For the current example, the indices could be extended to 1-110 to indicate additional guard band PRBs. This example is not limiting, in other implementations, different indices and numbers of PRBs can be indicated and the indices for the guard band PRBs may not be aligned with the indices of the in-band PRBs. For example, a set of RBs may be defined for standalone.

In another example implementation, the BS may signal a frequency offset of the additional available frequency resources relative to the frequency location of the anchor PRB. For example, the frequency offset may be in terms of PRBs, kHz, subcarriers, or other frequency units. The frequency offset can indicate frequency resources in-band, in the guard band, or standalone.

In addition, the BS can signal to the UE whether the anchor PRB is in-band, guard band, or standalone. According to certain aspects, the frequency offset may be interpreted differently by the UE depending on the anchor PRB mode (i.e., whether the anchor PRB is in-band, guard band, or standalone). For example, if the anchor PRB is standalone, the UE may interpret the offset in units of 200 kHz, but if the anchor PRB is in-band or guard band, the UE may interpret the offset in units of 180 kHz. In aspects, the UE can interpret the offset in other units based on the anchor PRB mode.

In some cases, the UE may move from one wideband system channel (e.g., LTE) to a different wideband system channel (e.g., LTE), for example, from the guard band of one wideband system to the guard band of another wideband system. In this case, the BS can also signal that the additional PRBs are in a different operating bandwidth.

According to certain aspects, the UE may be configured with a subset of PRBs available for communication. In this case, the BS may signal (e.g., in the SIB) which of the subset of PRB to use for the narrowband communications (e.g., via the indices or offset techniques described above) to indicate the additional frequency resources to the UE.

According to certain aspects, two fields may be used for indicating the available frequency resources (e.g., RBs) and the narrowband operating mode. For example, the BS may signal a first field that indicates whether frequency resources are in-band, guard band, or standalone and the BS may signal a second field that indicates the location of the additional resources (e.g., the RB indices or the offset). The UE may interpret the indication in the second field differently based on the indication provided in the first field. For example, if a PRB offset is provided in the second field, the offset can be interpreted as 15 kHz tones with respect to the last measured PRB if the indication is for guard band or can be interpreted as 180 kHz offsets if the indication is for in-band.

In yet another example implementation, the BS may signal an indication of an absolute frequency location of the additional frequency resources (e.g., available RBs). According to certain aspects, the BS can signal a frequency resource in a different carrier in-band, a different guard band, or for standalone from a different cell. In aspects, the additional frequency resources may be a list of other anchor RBs. The BS can also signal the deployment type of the additional frequency resources.

In yet another example implementation, the UE may be configured with a set of possible frequency resources (e.g., a set of PRBs) for narrowband communication. For example, possible PRBs may be predefined in the wireless standards. For each anchor PRB and each bandwidth, other PRB(s) may be fixed to certain locations. A bit or multiple bits may be signaled to the UE to determine the total number of PRB being used.

Example Information Sharing Between PRBs

According to certain aspects, one PRB of the available frequency resources (e.g., available for NB-IoT) can be used as an "anchor PRB". In an example implementation, the narrowband primary synchronization signal (PSS), the narrowband secondary synchronization signal (SSS), and/or the narrowband physical broadcast channel (PBCH) can be transmitted on the anchor PRB.

In another example implementation, all broadcast information may be transmitted in the anchor PRB. In this case, in addition to PSS, SSS, and PBCH, SIBs, random access messages, and paging may be sent in the anchor PRB.

Alternatively, some broadcast information may be transmitted in the anchor PRB and other broadcast information may be transmitted on other available PRBs. For example, PSS, SSS, PBCH, and SIB1 may be transmitted on the anchor PRB, but other SIBs, random access messages and/or paging may be sent in other PRBs available for narrowband communication between the BS and UE. In aspects, the SIB1 in the anchor PRB may include information to schedule the other transmissions, such as the other SIBs, RAR, and paging messages. Multiple frequency regions may be defined for the other transmissions and the UE may choose between the regions, for example, based on UE ID and/or coverage level.

In an example implementation, the anchor PRB may be self-contained. For example, all communications may be in the anchor PRB. Alternatively, some communications may be performed over other (e.g., multiple) PRBs. According to certain aspects, some UEs may be configured to communicate over only the anchor PRB, while other UEs may communicate using the anchor PRB and also additional PRBs. In an example, the transmissions on the anchor PRB and/or other PRBs may be based on capabilities of the UE (e.g., whether the UE is a legacy or non-legacy UE). For example, for certain types of UEs (e.g., Release-12 UEs or earlier), only anchor PRB communications may be supported, while other types of UE (e.g., Release-13 UEs or later) may support narrowband communications in additional (e.g., multiple) PRBs. In aspects, the UE may signal its capability (to communicate on anchor only or on other PRBs) to the network. In some cases, the UE can signal its UE version (e.g., the supported Releases by the UE).

Multi-PRB Operation for Paging Messages

According to certain aspects, all paging may be on the anchor PRB, even when the UE supports communication on other PRBs. Alternatively, all UEs may be paged on the anchor and/or other PRBs. In this case, the UEs may select (e.g., determine) PRBs to monitor for the paging, for example, based on UE ID.

In some cases, certain UEs may be pages on the anchor PRB only (e.g., UEs that support narrowband communication only on the anchor PRB), while other UEs may be paged on other PRBs (e.g., UEs that support narrowband communication on other PRBs). Thus, it may be desirable for the mobile management entity (MME) to be aware of whether the UE supports paging on the anchor only or on other PRBs as well. The MME may store the indication from the UE about the UE capability for anchor and non-anchor communications. Similarly, the UE may monitor for paging on anchor and non-anchor PRBs based on the UE's capability. For example, if the UE supports communications on multiple PRBs, the UE get the indication in the SIB of the additional PRBs and select which PRBs to monitor. The selection may be based on a higher layer parameter and/or the UE ID.

Multi-PRB Operation for Random Access Messages

According to certain aspects, all UEs may transmit physical random access channel (PRACH) messages and receive random access response (RAR) messages on only the anchor PRB, regardless whether the UE supports communications on the anchor PRB only or supports communications also on additional PRBs.

Alternatively, all UEs may transmit PRACH message and receive RAR messages on the anchor PRB and/or other PRBs. In this case, the UE may select (e.g., determine) the PRB to use for transmitting PRACH messages, for example, based on the coverage level (e.g., different coverage levels use different RBs). Alternatively, the UE may randomly select a preamble and a PRB for transmitting PRACH messages. The UE may monitor for RAR messages in a common RAR region or a different RAR region depending on the selected preamble and/or PRB.

In some cases, certain UEs (e.g., UEs that only support narrowband communications using the anchor PRB) may be capable of using only the anchor PRB for transmitting PRACH messages and receiving RAR messages, and other UEs (e.g., UEs that support narrowband communications using the anchor PRB and/or additional PRBs) may be capable of using non-anchor PRBs for transmitting PRACH messages and receiving RAR messages. The type of UE that only supports narrowband communication on the anchor PRB may use only the anchor for sending PRACH messages and receiving RAR messages. Alternatively, if the UE is capable of using multiple PRBs (e.g., the anchor PRB and/or additional PRBs) for narrowband communications, then for PRACH message transmission, the UE may select between using the anchor PRB or using other PRBs for the PRACH transmission and/or RAR message monitoring. The selection may be based on UE ID. The selection may be predefined in the SIB (e.g., the SIB may indicate that all UEs capable of narrowband communications on other PRBs than the anchor PRB monitor for RAR on the non-anchor PRBs). The PRB may be selected randomly by the UE. A subset of preambles in the anchor PRB may be reserved for the UEs capable of narrowband communication only on the anchor PRB. The reserved preamble may be used to signal the capability to transmit PRACH and receive RAR in non-anchor PRBs.

According to certain aspects, there may be a linkage between the PRACH PRB or PRACH preamble and the RAR PRB such that some UEs can use multiple different RBs, while others UEs use only the anchor PRB for communications.

In one example implementation, the UE may receive signaling (e.g., in SIB1) indicating other PRBs than the anchor PRB are available for narrowband communications. The UE may use the other PRBs, for example, for PRACH transmissions. In some cases, different resources may be available in different PRBs. For example, different PRACH bundling sizes may be used for different PRBs.

In another example implementation, the UE may perform random access (e.g., send PRACH and/or other messages) on the anchor PRB. The UE may also send other messages on the anchor PRB, until the RACH procedure and RRC reconfiguration is complete. After the RRC reconfiguration, the UE may transmit on other PRBs.

According to certain aspects, uplink and downlink PRBs may be decoupled. For example, the UE may use a first set of PRBs for uplink communications and a different set of PRBs for downlink communications.

According to certain aspects, synchronization signals such as PSS and SSS may be transmitted in the anchor PRB and sparser synchronization signals can be transmitted in non-anchor PRBs at a greater periodicity. This may be useful for the UE to perform time and/or frequency tracking. In one example, PSS may be transmitted every 10 ms in the anchor PRB and every 100 ms in the non-anchor PRB. According to certain aspects, to avoid the UE synching to a non-anchor PRB during the initial search, different sequences may be used in the anchor PRB and other PRBs. In aspects, an indication may be provided in the PBCH and/or SIB that the PRB is not an anchor PRB. An indication may also be provided that indicates the location of the anchor PRB.

According to certain aspects, if the non-anchor PRB and the anchor PRB are in different deployment modes (e.g., in-band, guard band, standalone), additional signaling may be used. For example, if the anchor PRB is in the guard band and the non-anchor PRB is in-band, then control format indication (CFI) information may be provided. The information may also include bandwidth information and/or CRS scrambling information. The information may be used to perform rate matching.

According to certain aspects, different power levels may be used for transmissions in different PRBs. For example, for downlink transmissions, different power spectral density (PSD) boosting may be used in different PRBs. For uplink transmission, different maximum power levels may be used for transmissions in different PRB s.

According to certain aspects, the BS may also signal co-location information of the other PRBs to the UE. The UE may run separate time and frequency tracking loops on the other PRBs if they are not co-located.

As discussed above, SIB information may be split between multiple PRBs. Some common information (e.g., CSI-RS configuration for the wideband cell, number of OFDM symbols for control, etc.) may be sent only in the anchor PRB SIB. Some PRB-specific information may be included in the other PRBs.

According to certain aspects, the anchor PRB SIB may also include an indication of a change in SIB of the other PRBs (e.g., by sharing a value tag, or by transmitting the value tag of the other PRB as well). The other PRBs' SIB may include an indication of the change in SIB of the anchor PRB.

Figure 12:
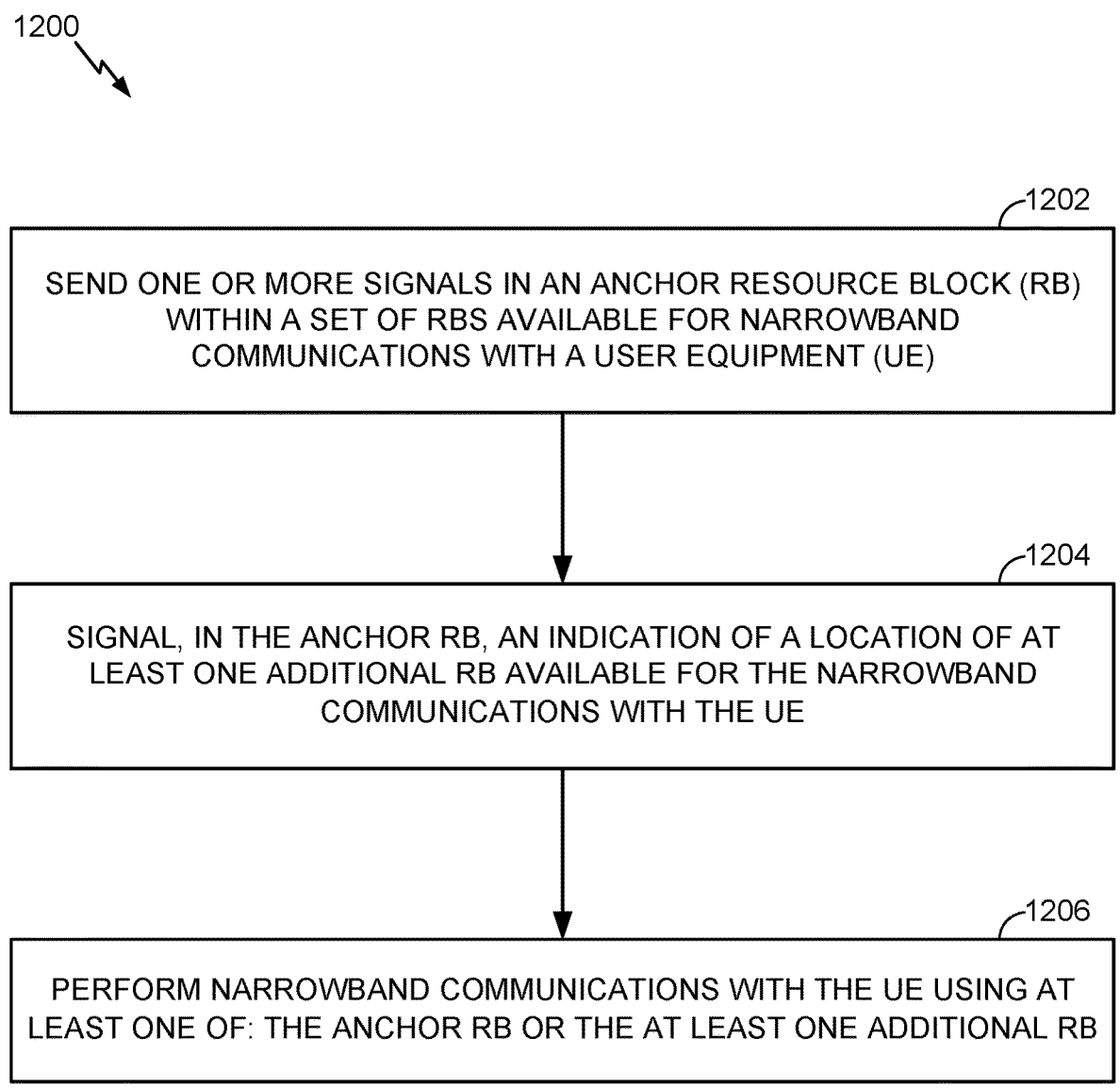
FIG. 12 is a flow diagram illustrating example operations for wireless communications by a BS, in accordance with certain aspects of the present disclosure.

FIG. 12 is a flow diagram illustrating example operations for wireless communications by a BS (e.g., BS 110), in accordance with certain aspects of the present disclosure. The operations 1200 may comprise complementary operations performed by the BS to the operations 1100 performed by the UE. The operations 1200 may begin, at 1202, by sending one or more signals in an anchor RB within a set of RBs available for narrowband communications with a UE. At 1204, the BS signals, in the anchor RB, an indication of a location of at least one additional RB available for the narrowband communications with the UE. At 1206, the BS performs narrowband communications with the UE using at least one of: the anchor RB or the at least one additional RB.

According to certain aspects, the techniques described herein (e.g., such as operations 1200) may be performed by a single network entity or shared among multiple network entities. For example, the procedure to transmit paging may be shared among the MME and BS.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for monitoring, means for sending, means for signaling, and/or means for communicating may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving one or more signals in an anchor resource block (RB) for narrowband communications with a base station (BS);
   determining at least one additional RB for the narrowband communications with the BS based on a first indication of an absolute frequency of the at least one additional RB and a second indication of whether the at least one additional RB is in at least one of: an in-band location, a guard band location, or a standalone location, the first indication and the second indication received via radio resource control (RRC) signaling in the anchor RB; and
   performing the narrowband communications with the BS using at least one of: the anchor RB or the at least one additional RB.

2. The method of claim 1, wherein the one or more signals comprise at least one of a primary synchronization signal (PSS), a secondary synchronization signal (SSS), or a physical broadcast channel (PBCH) signal.

3. The method of claim 1, wherein:
   the UE is configured with a limited set of possible RBs for narrowband communications; and
   the first indication comprises an indication of at least one of the limited set of possible RBs.

4. The method of claim 1, wherein the first indication is interpreted based on the second indication.

5. The method of claim 1, further comprising:
   receiving one or more types of system information block (SIB) broadcast messages in the anchor RB; and
   receiving at least one of: another type of SIB message, a random access response (RAR) message, or a paging message, in at least one of: the anchor RB or the at least one additional RB.

6. The method of claim 1, wherein performing the narrowband communications comprises receiving at least one narrowband communication from the BS on only the anchor RB.

7. The method of claim 1, wherein:
   the anchor RB is located within a first operating bandwidth; and
   the at least one additional RB is located within a second operating bandwidth.

8. The method of claim 1, wherein the at least one additional RB comprises another anchor RB.

9. The method of claim 1, further comprising:
   receiving an indication that the at least one additional RB is not an anchor RB.

10. The method of claim 1, further comprising:
    receiving a system information block (SIB) in the anchor RB having an indication of a change in a SIB received in the at least one additional RB.

11. The method of claim 1, wherein the second indication comprises whether the at least one additional RB is in the in-band location.

12. A method for wireless communications by a base station (BS), comprising:
    transmitting one or more signals in an anchor resource block (RB) for narrowband communications with a user equipment (UE);

transmitting, via radio resource control (RRC) signaling in the anchor RB, a first indication of an absolute frequency of at least one additional RB for the narrowband communications with the UE and a second indication of whether a location of the at least one additional RB is at least one of: an in-band location, a guard band location, or a standalone location; and performing the narrowband communications with the UE using at least one of: the anchor RB or the at least one additional RB.

13. The method of claim 12, wherein the one or more signals comprise at least one of a primary synchronization signal (PSS), a secondary synchronization signal (SSS), or a physical broadcast channel (PBCH) signal.

14. The method of claim 12, wherein:
the UE is configured with a limited set of possible RBs for narrowband communications; and
the first indication comprises an indication of at least one of the limited set of possible RBs.

15. The method of claim 12, wherein the first indication is interpreted based on the second indication.

16. The method of claim 12, further comprising:
transmitting one or more types of system information block (SIB) broadcast messages in the anchor RB; and
transmitting at least one of: another type of SIB message, a random access response (RAR) message, or a paging message, in at least one of: the anchor RB or the at least one additional RB.

17. The method of claim 12, wherein performing the narrowband communications comprises transmitting at least one narrowband communication to the UE on only the anchor RB.

18. The method of claim 12, wherein:
the anchor RB is located within a first operating bandwidth; and
the at least one additional RB is located within a second operating bandwidth.

19. The method of claim 12, wherein the at least one additional RB comprises another anchor RB.

20. The method of claim 12, further comprising:
transmitting an indication that the at least one additional RB is not an anchor RB.

21. The method of claim 12, further comprising:
transmitting a system information block (SIB) in the anchor RB having an indication of a change in a SIB transmitted in the at least one additional RB.

22. The method of claim 12, wherein the second indication comprises whether the at least one additional RB is in the in-band location.

23. An apparatus for wireless communications by a user equipment (UE), comprising:
at least one processor; and
memory coupled to the at least one processor, the memory comprising instructions executable by the at least one processor to cause the UE to:
receive one or more signals in an anchor resource block (RB) for narrowband communications with a base station (BS);
determine at least one additional RB for the narrowband communications with the BS based on a first indication of an absolute frequency of the at least one additional RB and a second indication of whether a location of the at least one additional RB is at least one of: an in-band location, a guard band location, or a standalone location, the first indication and the second indication received via radio resource control (RRC) signaling in the anchor RB; and
perform the narrowband communications with the BS using at least one of: the anchor RB or the at least one additional RB.

24. The apparatus of claim 23, wherein the one or more signals comprise at least one of a primary synchronization signal (PSS), a secondary synchronization signal (SSS), or a physical broadcast channel (PBCH) signal.

25. The apparatus of claim 23, wherein:
the UE is configured with a limited set of possible RBs for narrowband communications; and
the first indication comprises an indication of at least one of the limited set of possible RBs.

26. The apparatus of claim 23, wherein the first indication is interpreted based on the second indication.

27. The apparatus of claim 23, wherein the instructions are further executable by the at least one processor to cause the UE to:
receive one or more types of system information block (SIB) broadcast messages in the anchor RB; and
receive at least one of: another type of SIB message, a random access response (RAR) message, or a paging message, in at least one of: the anchor RB or the at least one additional RB.

28. The apparatus of claim 23, wherein performing the narrowband communications comprises receiving at least one narrowband communication from the BS on only the anchor RB.

29. The apparatus of claim 23, wherein:
the anchor RB is located within a first operating bandwidth; and
the at least one additional RB is located within a second operating bandwidth.

30. The apparatus of claim 23, wherein the at least one additional RB comprises another anchor RB.

31. The apparatus of claim 23, wherein the instructions are further executable by the at least one processor to cause the UE to:
receive an indication that the at least one additional RB is not an anchor RB.

32. The apparatus of claim 23, wherein the instructions are further executable by the at least one processor to cause the UE to:
receive a system information block (SIB) in the anchor RB having an indication of a change in a SIB received in the at least one additional RB.

33. The apparatus of claim 23, wherein the second indication comprises whether the at least one additional RB is in the in-band location.

34. An apparatus for wireless communications by a base station (BS), comprising:
at least one processor; and
memory coupled to the at least one processor, the memory comprising instructions executable by the at least one processor to cause the BS to:
transmit one or more signals in an anchor resource block (RB) for narrowband communications with a user equipment (UE);
transmit, via radio resource control (RRC) signaling in the anchor RB, a first indication of an absolute frequency of at least one additional RB for the narrowband communications with the UE and a second indication of whether a location of the at least one additional RB is at least one of: an in-band location, a guard band location, or a standalone location; and perform the narrowband communications with the UE using at least one of: the anchor RB or the at least one additional RB.

35. The apparatus of claim 34, wherein the one or more signals comprise at least one of a primary synchronization signal (PSS), a secondary synchronization signal (SSS), or a physical broadcast channel (PBCH) signal.

36. The apparatus of claim 34, wherein:
the UE is configured with a limited set of possible RBs for narrowband communications; and
the first indication comprises an indication of at least one of the limited set of possible RBs.

37. The apparatus of claim 34, wherein the first indication is interpreted based on the second indication.

38. The apparatus of claim 34, the instructions are further executable by the at least one processor to cause the BS to:
transmit one or more types of system information block (SIB) broadcast messages in the anchor RB; and
transmit at least one of: another type of SIB message, a random access response (RAR) message, or a paging message, in at least one of: the anchor RB or the at least one additional RB.

39. The apparatus of claim 34, wherein performing the narrowband communications comprises transmitting at least one narrowband communication to the UE on only the anchor RB.

40. The apparatus of claim 34, wherein:
the anchor RB is located within a first operating bandwidth; and
the at least one additional RB is located within a second operating bandwidth.

41. The apparatus of claim 34, wherein the at least one additional RB comprises another anchor RB.

42. The apparatus of claim 34, the instructions further executable by the at least one processor to cause the BS to:
transmit an indication that the at least one additional RB is not an anchor RB.

43. The apparatus of claim 34, the instructions further executable by the at least one processor to cause the BS to:
transmit a system information block (SIB) in the anchor RB having an indication of a change in a SIB transmitted in the at least one additional RB.

44. The apparatus of claim 34, wherein the second indication comprises whether the at least one additional RB is in the in-band location.

45. An apparatus for wireless communications by a user equipment (UE), comprising:
means for receiving one or more signals in an anchor resource block (RB) for narrowband communications with a base station (BS);
means for determining at least one additional RB for the narrowband communications with the BS based on a first indication of an absolute frequency of the at least one additional RB and a second indication of whether a location of the at least one additional RB is at least one of: an in-band location, a guard band location, or a standalone location, the first indication and the second indication received via radio resource control (RRC) signaling in the anchor RB; and
means for performing the narrowband communications with the BS using at least one of: the anchor RB or the at least one additional RB.

46. An apparatus for wireless communications by a base station (BS), comprising:
means for transmitting one or more signals in an anchor resource block (RB) for narrowband communications with a user equipment (UE);
means for transmitting, via radio resource control (RRC) signaling in the anchor RB, a first indication of an absolute frequency of at least one additional RB for the narrowband communications with the UE and a second indication of whether a location of the at least one additional RB is at least one of: an in-band location, a guard band location, or a standalone location; and
means for performing the narrowband communications with the UE using at least one of: the anchor RB or the at least one additional RB.

47. A non-transitory computer-readable medium for wireless communications by a user equipment (UE), comprising:
code for receiving one or more signals in an anchor resource block (RB) for narrowband communications with a base station (BS);
code for determining at least one additional RB for the narrowband communications with the BS based on a first indication of an absolute frequency of the at least one additional RB and a second indication of whether a location of the at least one additional RB is at least one of: an in-band location, a guard band location, or a standalone location, the first indication and the second indication received via radio resource control (RRC) signaling in the anchor RB; and
code for performing the narrowband communications with the BS using at least one of: the anchor RB or the at least one additional RB.

48. A non-transitory computer-readable medium for wireless communications by a base station (BS), comprising:
code for transmitting one or more signals in an anchor resource block (RB) for narrowband communications with a user equipment (UE);
code for transmitting, via radio resource control (RRC) signaling in the anchor RB, a first indication of an absolute frequency of at least one additional RB for the narrowband communications with the UE and a second indication of whether a location of the at least one additional RB is at least one of: an in-band location, a guard band location, or a standalone location; and
code for performing the narrowband communications with the UE using at least one of: the anchor RB or the at least one additional RB.

* * * * *